United States Patent [19]

Besseyre

[11] 3,821,494

[45] June 28, 1974

[54] DIGITAL ECHO SUPPRESSOR WITH DIRECT TABLE LOOK-UP CONTROL BY DELTA CODED SIGNALS

[75] Inventor: Jacques A. Besseyre, Nice, France

[73] Assignee: International Business Machines Corporation, Armonk, N.Y.

[22] Filed: July 14, 1972

[21] Appl. No.: 271,960

[52] U.S. Cl........... 179/170.6, 179/170.2, 179/170.8

[51] Int. Cl. ............................................. H04b 3/20

[58] Field of Search........... 179/170.2, 170.6, 170.8; 178/70 R; 325/38 B; 307/222 R; 340/172.5

[56] References Cited

UNITED STATES PATENTS

| | | | |
|---|---|---|---|
| 2,897,275 | 7/1959 | Bowers | 325/38 B |
| 3,562,448 | 2/1971 | May | 179/170.6 |
| 3,576,973 | 4/1971 | Draper | 307/222 R |
| 3,597,541 | 8/1971 | Proakis | 178/70 R |
| 3,673,355 | 6/1972 | LaMarche | 179/170.6 |

*Primary Examiner*—Kathleen H. Claffy
*Assistant Examiner*—Alan Faber

[57] ABSTRACT

A digital echo suppressor in combination with a transmit channel and a receive channel, and in which sequences of digital delta coded signals in both channels are monitored and used to address a memory medium. In this context, each occurrence of a predetermined number of successive matched delta coded digits of either a first or second kind is used to correspondingly increment or decrement the memory address register. Relatedly, the contents of the memory locations constitute corresponding control signals for operating the transmit channel suppressor and for altering the receive channel gain.

5 Claims, 6 Drawing Figures

| $A_0$ | $A_1$ | $A_2$ | $A_3$ | $A'_0$ | $A'_1$ | $A'_2$ | $A'_3$ | OUT |
|---|---|---|---|---|---|---|---|---|
| 0 | 0 | 0 | 0 | 0 | 0 | 0 | 0 | 1 |
| 0 | 0 | 0 | 1 | 0 | 0 | 0 | 0 | 1 |
| 0 | 0 | 0 | 1 | 0 | 0 | 0 | 1 | 1 |
| 0 | 0 | 1 | 0 | 0 | 0 | 0 | 0 | 1 |
| 0 | 0 | 1 | 0 | 0 | 0 | 0 | 1 | 1 |
| 0 | 0 | 1 | 0 | 0 | 0 | 1 | 0 | 1 |
| 0 | 0 | 1 | 1 | 0 | 0 | 0 | 0 | 1 |
| 0 | 0 | 1 | 1 | 0 | 0 | 0 | 1 | 1 |
| 0 | 0 | 1 | 1 | 0 | 0 | 1 | 0 | 1 |
| 0 | 0 | 1 | 1 | 0 | 0 | 1 | 1 | 1 |
| 0 | 1 | 0 | 0 | 0 | 0 | 0 | 0 | 1 |
| 0 | 1 | 0 | 0 | 0 | 0 | 0 | 1 | 1 |
| 0 | 1 | 0 | 0 | 0 | 0 | 1 | 0 | 1 |
| 0 | 1 | 0 | 0 | 0 | 0 | 1 | 1 | 1 |
| 0 | 1 | 0 | 0 | 0 | 1 | 0 | 0 | 1 |
| 0 | 1 | 0 | 1 | 0 | 0 | 0 | 0 | 1 |
| 0 | 1 | 0 | 1 | 0 | 0 | 0 | 1 | 1 |
| 0 | 1 | 0 | 1 | 0 | 0 | 1 | 0 | 1 |
| 0 | 1 | 0 | 1 | 0 | 0 | 1 | 1 | 1 |
| 0 | 1 | 0 | 1 | 0 | 1 | 0 | 0 | 1 |
| 0 | 1 | 0 | 1 | 0 | 1 | 0 | 1 | 1 |
| 0 | 1 | 1 | 0 | 0 | 0 | 0 | 0 | 1 |
| 0 | 1 | 1 | 0 | 0 | 0 | 0 | 1 | 1 |
| 0 | 1 | 1 | 0 | 0 | 0 | 1 | 0 | 1 |
| 0 | 1 | 1 | 0 | 0 | 0 | 1 | 1 | 1 |
| 0 | 1 | 1 | 0 | 0 | 1 | 0 | 0 | 1 |
| 0 | 1 | 1 | 0 | 0 | 1 | 0 | 1 | 1 |
| 0 | 1 | 1 | 0 | 0 | 1 | 1 | 0 | 1 |
| 0 | 1 | 1 | 1 | 0 | 0 | 0 | 0 | 1 |
| 0 | 1 | 1 | 1 | 0 | 0 | 0 | 1 | 1 |
| 0 | 1 | 1 | 1 | 0 | 0 | 1 | 0 | 1 |
| 0 | 1 | 1 | 1 | 0 | 0 | 1 | 1 | 1 |
| 0 | 1 | 1 | 1 | 0 | 1 | 0 | 0 | 1 |
| 0 | 1 | 1 | 1 | 0 | 1 | 0 | 1 | 1 |
| 0 | 1 | 1 | 1 | 0 | 1 | 1 | 0 | 1 |
| 0 | 1 | 1 | 1 | 0 | 1 | 1 | 1 | 1 |
| 1 | 0 | 0 | 0 | 0 | 0 | 0 | 0 | 1 |
| 1 | 0 | 0 | 0 | 0 | 0 | 0 | 1 | 1 |
| 1 | 0 | 0 | 0 | 0 | 0 | 1 | 0 | 1 |
| 1 | 0 | 0 | 0 | 0 | 0 | 1 | 1 | 1 |
| 1 | 0 | 0 | 0 | 0 | 1 | 0 | 0 | 1 |
| 1 | 0 | 0 | 0 | 0 | 1 | 0 | 1 | 1 |
| 1 | 0 | 0 | 0 | 0 | 1 | 1 | 0 | 1 |
| 1 | 0 | 0 | 0 | 0 | 1 | 1 | 1 | 1 |
| 1 | 0 | 0 | 0 | 1 | 0 | 0 | 0 | 1 |
| 1 | 0 | 0 | 1 | 0 | 0 | 0 | 0 | 1 |
| 1 | 0 | 0 | 1 | 0 | 0 | 0 | 1 | 1 |
| 1 | 0 | 0 | 1 | 0 | 0 | 1 | 0 | 1 |
| 1 | 0 | 0 | 1 | 0 | 0 | 1 | 1 | 1 |

| | | | | | | | | |
|---|---|---|---|---|---|---|---|---|
| 1 | 1 | 1 | 0 | 0 | 1 | 0 | 0 | 1 |
| 1 | 1 | 1 | 0 | 0 | 1 | 0 | 1 | 1 |
| 1 | 1 | 1 | 0 | 0 | 1 | 1 | 0 | 1 |
| 1 | 1 | 1 | 0 | 0 | 1 | 1 | 1 | 1 |
| 1 | 1 | 1 | 0 | 1 | 0 | 0 | 0 | 1 |
| 1 | 1 | 1 | 0 | 1 | 0 | 0 | 1 | 1 |
| 1 | 1 | 1 | 0 | 1 | 0 | 1 | 0 | 1 |
| 1 | 1 | 1 | 0 | 1 | 0 | 1 | 1 | 1 |
| 1 | 1 | 1 | 0 | 1 | 1 | 0 | 0 | 1 |
| 1 | 1 | 1 | 0 | 1 | 1 | 0 | 1 | 1 |
| 1 | 1 | 1 | 0 | 1 | 1 | 1 | 0 | 1 |
| 1 | 1 | 1 | 1 | 0 | 0 | 0 | 0 | 1 |
| 1 | 1 | 1 | 1 | 0 | 0 | 0 | 1 | 1 |
| 1 | 1 | 1 | 1 | 0 | 0 | 1 | 0 | 1 |
| 1 | 1 | 1 | 1 | 0 | 0 | 1 | 1 | 1 |
| 1 | 1 | 1 | 1 | 0 | 1 | 0 | 0 | 1 |
| 1 | 1 | 1 | 1 | 0 | 1 | 0 | 1 | 1 |
| 1 | 1 | 1 | 1 | 0 | 1 | 1 | 0 | 1 |
| 1 | 1 | 1 | 1 | 0 | 1 | 1 | 1 | 1 |
| 1 | 1 | 1 | 1 | 1 | 0 | 0 | 0 | 1 |
| 1 | 1 | 1 | 1 | 1 | 0 | 0 | 1 | 1 |
| 1 | 1 | 1 | 1 | 1 | 0 | 1 | 0 | 1 |
| 1 | 1 | 1 | 1 | 1 | 0 | 1 | 1 | 1 |
| 1 | 1 | 1 | 1 | 1 | 1 | 0 | 0 | 1 |
| 1 | 1 | 1 | 1 | 1 | 1 | 0 | 1 | 1 |
| 1 | 1 | 1 | 1 | 1 | 1 | 1 | 0 | 1 |
| 1 | 1 | 1 | 1 | 1 | 1 | 1 | 1 | 1 |

FIG. 3C

DIGITAL ECHO SUPPRESSOR WITH DIRECT TABLE LOOK-UP CONTROL BY DELTA CODED SIGNALS

BACKGROUND OF THE INVENTION

This invention relates to echo suppressors, and more particularly to echo suppressors having simplified control apparatus responsive to delta coded data signals.

ECHO AND THE PRIOR ART

In this invention, echo is understood to mean the portion of an output of a system which is fed back and modulates the system input after a substantial time delay. In a duplex telephone transmission system, echo appears as a replica of the speech wave uttered by a talker but perceived by him on his receive channel at least 45 milliseconds later. The points along a communications link where this feedback is thought to occur in a telephone system include the hybrid junctions ordinarily terminating full duplex four-wire telephone paths and the magnetic coupling of channels at some intermediate point along their extent.

The question arises as to whether echo constitutes a significant interference problem in digital data transmission, reproduction and recording. This raises the question as to the ability of a terminal to discriminate between a valid message and an echo. In wide band high-speed synchronous digital character oriented communications systems, echo interference is not believed to be a problem. Such systems provide sufficient redundancy coding in their messages to enable early detection of any interference due to echos. This contrasts, however, to the situation involving parallel tone transmission and in bit oriented start-stop systems wherein echos look like any other type of line transition.

Bennett points out in "Data Transmission," McGraw Hill Book Company, New York, 1965, at page 21 that start-stop systems, such as the printing telegraph, can be defined as systems in which "a fixed time pattern is used for the group of symbols representing a character, but each group is preceded by a signal transition which serves as a symbol to denote where the fixed pattern is to start." Accordingly, to the extent that echo appears as transitions, then a start-stop system would interpret echos as valid characters. Such start-stop systems may be manually operated with no automatic error detection built into them. To this extent, operator review of telegraph printer text may require retransmission over an already slow-speed system, thereby diminishing the data throughput drastically.

To be sure, telephone operating companies provide echo suppression designed primarily for voice communications. However, modems which normally couple digital machines to telephone supplied transmission facilities must be designed to take into account the comparatively long switching in and switching out time of the telephone company echo suppressors. Furthermore, where common carriers provide such echo suppression, their reliability may be in doubt. One strategy for avoiding these adverse effects would be to lease a data channel without telephone company echo suppression and include this line function in a modem having a suppressor capable of faster switching speeds.

SUPPRESSION AND THE PRIOR ART

Suppression, as understood, means that the gain and the opened or closed circuit condition of the transmit and receive channels of a talker terminal may be selectively altered during all or some part of the talker time, and, for a period of time thereafter. Additionally, there should also be some way of resolving contention between the near and far terminals. Illustrative of prior art analog systems are Schoeffler, U.S. Pat. No. 3,280,274 and P. T. Brady, U.S. Pat. No. 3,351,720. Brady for example, discloses an arrangement which maintains suppression in response to speech from a distant party when the interruption was unintentional.

In these prior art systems, detectors measure the amplitude level on both the inbound and outbound path. A relative magnitude difference signal and a timing circuit are used for operating the suppressors. It is observed that the problem of contention is not entirely resolved. Given the situation, at the near terminal where a received signal is detected to transmitting, then the transmit side of the near terminal will be suppressed. If the transmit side was first to transmit, then the received side would be suppressed. In these cases, the rule of action appears to be that the suppressors work in favor of the channel having the highest detected level or gain at any point in time and for a fixed time after the relative level shifts from one channel to another.

Moye in U.S. Pat. No. 3,588,385 and May in U.S. Pat. No. 3,562,448 both utilize digital control apparatus for regulating echo suppression. Moye shows a corelator and an adaptive filter for suppressing echos by computing an electrical signal which is equivalent to the echo, inverting the computed signal, and adding it to the signal being received. In contrast, May discloses a common control logic arrangement for controlling echo suppressors in a plurality of duplex transmission lines. According to May, a suppressor situated in a transmit channel would be activated only if the transmit line was idle and the receive line was not. Lastly, May discloses apparatus directed to the problem of rapidly scanning a large number of duplex lines, by memorizing the detected line signal condition in an appropriate storage device, and by ascertaining the signal state of two or more devices on the line.

SUMMARY OF THE INVENTION

It is an object of this invention to devise an echo suppressor capable of a fast change of state and responsive to digital control. It is a related object that the digital control apparatus for such suppressor be adapted to measure signal magnitude or gain in the form of digital representations, said control apparatus being of simplified design and being additionally capable of varying the control apparatus sensitivity to the receive channel gain.

The foregoing objects are satisfied by an embodiment of an echo suppressor for a transmit and receive channel. The embodiment includes suppressor means in the transmit channel operatively responsive to digital control signals, a memory medium having control signals stored at discrete memory locations therein; means for deriving digitally delta encoded signals from the transmit and receive channels; and means responsive to the derived digital delta coded signals for forming memory addresses from the number of successively matched delta coded digits in each channel, for extracting the control signals from the memory at the memory address, and for applying the successively extracted control signals to the suppressor means.

In the preferred embodiment, the signals on the transmit and receive channels are delta modulation encoded. Sufficient inertia is introduced into the control system by forming memory addresses not from the delta modulation sequences directly, but from the variable count of the number of successive matched digits.

In this invention, each channel is monitored by a sequence detector which increments or decrements a corresponding reversible counter if a predetermined succession of ones or zeros has been detected. The contents of the reversible counters are real positive integers and together define discrete address locations in the memory. If the magnitude A of the transmit channel counter is greater than or equal to the magnitude A′ of the receive channel counter, then control signal is extracted from the memory at address AA′ which keeps the transmit channel conducting and diminishes the receive counter contents by a preset amount. Likewise, if A < A′ then a control signal is extracted which energizes the suppressor thereby opening the transmit channel.

DESCRIPTION OF THE PREFERRED EMBODIMENT

Figure 1:
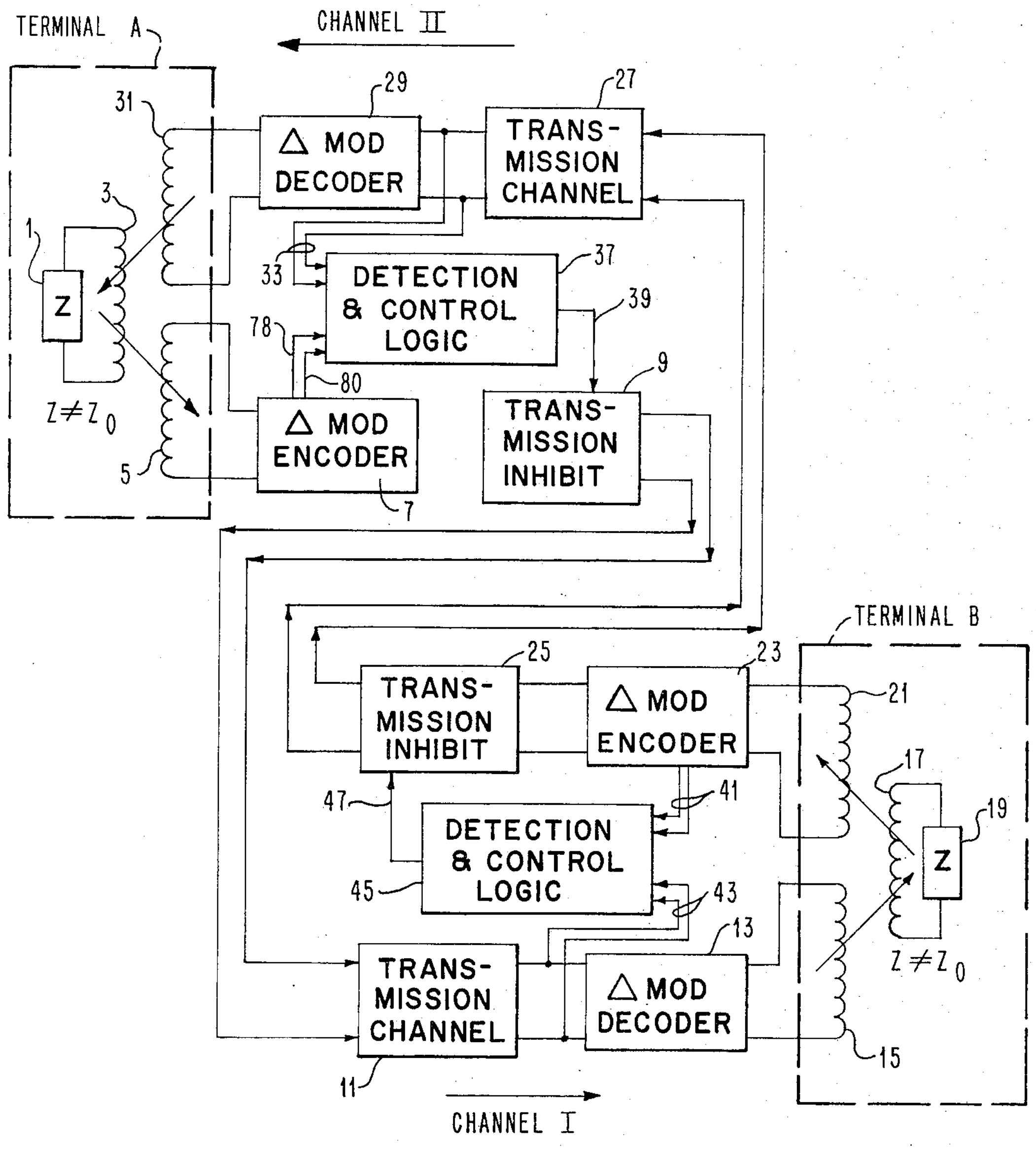
FIG. 1 represents a duplex channel in which both the near and far terminal include an echo suppressor having a delta modulation encoder, an inhibit gate in the transmit channel, a delta modulation encoder in the receive channel, and detection and control logic.

Referring now to FIG. 1, there is shown a pair of oppositely poled channels. Channel I communicates data from terminal A to terminal B. Likewise, channel II propagates data generated by terminal B to terminal A. For purposes of discussion, impedance elements 1 and 19 at respective terminals A and B may be considered as devices capable of receiving signals or transmitting signals. The impedance notation is used to highlight the fact that on four-wire duplex systems the hybrid junction at the terminals is frequently considered the point at which the portion of the signal in the receive channel is fed back into the transmit channel. Admittedly, echos may be variously defined as reflectances or as a form of interference modulation when one channel is magnetically coupled to another such as in cross-talk. In the reflectance situation, where transmission line load Z is not terminated in the characteristic impedance of the line $Z_0$, then cross coupling by way of transformer action from, say, channel II to channel I is possible.

An analog signal appearing at terminal A would be impressed on channel I and converted into a sequence of digital signals by delta modulation encoder 7. The digital signal sequence is then transmitted through normally conducting transmission inhibit gate 9 over transmission channel 11. At the end of the channel, the signal is reconverted into an analog varying signal by delta modulation decoder 13. The analog signal is applied to terminal B and may be received by element 19 through transformer coupling over primary and secondary turns 15 and 17. Data originating at terminal B destined for terminal A would in its turn be converted into digital sequences by delta modulation encoder 23 and transmitted through normally conducting inhibit gate 25 over the transmission channel 27. The digital signal would be reconverted into an analog varying signal by delta modulation encoder 29. Alternatively, the channel equipment between the two terminals might be housed in one of several repeaters strung along a communication link. Instead of being exclusively for digital data transmission at the terminal, the invention at the repeaters would require analog to digital conversion means for operating echo suppression, with digital to analog reconversion means to propagate the signals further down the line.

The basic arrangement of the invention includes the use of transmission inhibit gates 9 and 25 as operated by corresponding detection and control logics 37 and 45. The detection and control logic 37 develops a control signal on path 39 in response to the digital delta modulation encoded sequences monitored on both channels. For control logic 37, the output of a sequence detector in the delta modulation encoder 7 and the input to delta modulation decoder 29 is used. Comparably, the output of the sequence detector in delta modulation encoder 23 and the input sequence to delta modulation decoder 13 over paths 41 and 43 drive control logic 45.

A time varying signal applied, for example, to delta modulation encoders 7 would be represented at the encoder output by a series of ones and zeros.

Operationally, a time varying signal is presented to the delta modulation encoder. The output digital sequence is transmitted upon both to the transmission channel and to the detection and control logic. The detection and control logic, by monitoring the bit streams in each channel continuously, can directly measure the amplitude or gain of the system. One should recall that a digital delta modulation encoded bit stream represents an instant numerical measure of the amplitude time rate of change of a corresponding analog signal. Thus, a string of 1111 would indicate a positive increasing signal amplitude, whereas 0000 would imply a decreasing signal amplitude. If the gain or sequence of 1111 were measured on channel I at encoder output 7 and the gain or amplitude of 0000 were measured at the input to decoder 29, then in this system 1111 > 0000. It may be said that what is being compared is the positive real number binary integer representations of analog signal magnitudes. In principle, the control logic will generate on a one to one basis, a control signal on path 39 for operating transmission inhibit gate 9 for each gain magnitude measured on the respective channels. Consequently, for continuous serial input to logic 37 over paths 33 and 35, there will result a continuous serial output of control signals on line 39 to gate 9. The same principles of operation apply to the serial digital inputs on paths 41 and 43 applied to logic 45 for developing a serial control signal output over path 47 to inhibit gate 25.

The arrows indicate the direction of communications. At each of the terminals, to the extent that there is an imperfect matching of the terminal impedance Z with the characteristic line impedance $Z_0$, then a portion of the energy in a receive channel will be fed back into the corresponding transmit channel.

Figure 2:
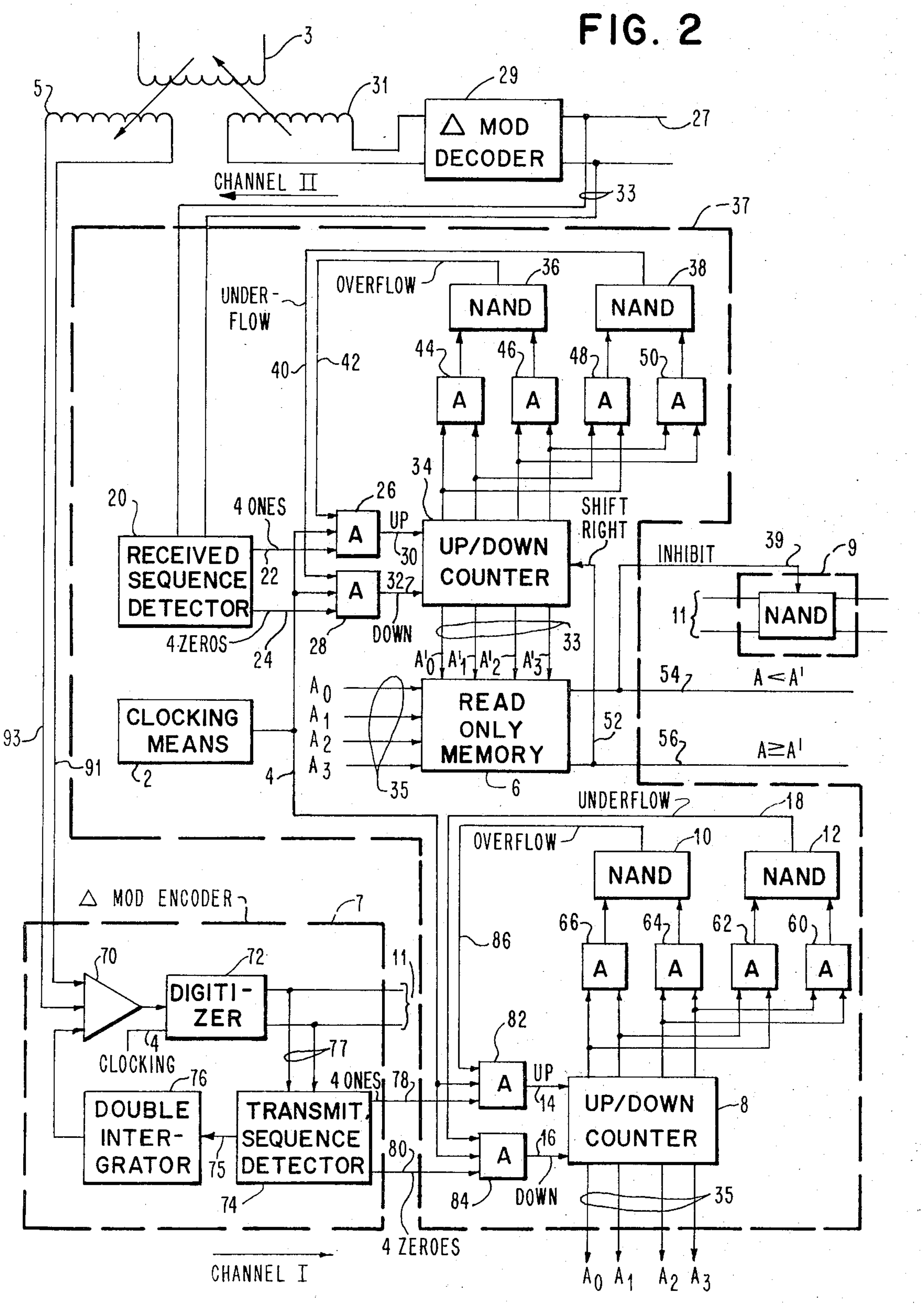
FIG. 2 sets forth a logic level diagram of the invention emphasizing the detection and control logic, and the delta modulation encoder.

Referring now to FIG. 2, there is shown a logic diagram of the embodiment disclosed in FIG. 1. Suppose an amplitude varying signal at terminal A is impressed on the primary winding 3 and induced across the secondary winding 5. Such a signal will be presented at the input of the comparator circuit 70 of delta modulation encoder 7. The modulation encoder can preferably be of the double integrator type such as that, for example, described by P. F. Panter in "Modulation, Noise, and Spectral Analysis" McGraw Hill Book Co., New York, 1965, at pages 679–699.

In this embodiment, comparator 70 and digitizer 72 generate a first or second digital signal at a rate determined by clocking means 2 as distributed to various circuits over path 4. A binary "1" is generated, if at the clocking or sampling time, the instantaneous magnitude appearing on path 91 exceeds the reference magnitude output from double integrator 76. Likewise, digitizer 72 produces a binary "0" upon the occurrence of the clocking interval if the magnitude upon path 91 is equal to or less than the reference value of the integrator 76 output. The successive ones and zeros generated by digitizer 72 are simultaneously applied to transmission channel 11 and the transmit sequence detector 74. The sequence detector can be formed from a shift register and associated logic. The detector produces a signal on path 78 when four binary ones have been detected in sequence. Similarly, a signal is impressed on path 80 when four zeros have been detected in sequence. Successive digits are shifted out to double integrator 76 from the sequence detector 74 over path 75. For a typical design of an encoder with a transmit sequence detector and double integrator, reference can also be made to R. C. Weston, U.S. Pat. No. 3,555,423, issued on Jan. 12, 1971. In this regard, Weston shows the use of a counter at the delta modulator encoder output followed by two stages of integration in the feedback loop to the comparator.

The output of delta modulation encoder 7 on path 11 is applied to inhibit gate 9. The inhibit gate is depicted as a NAND gate if a signal is present on channel 11 and inhibit path 39, then there is no output from the NAND gate. For an interesting discussion on NAND invert or NOR invert logics see R. K. Richards' discussion in "Digital Design," Wiley-Interscience, 1971, pages 78–85.

Referring now to the receive channel II, the delta modulation decoder 29 has applied to it a series of digital delta modulation encoded pulses originated from terminal B. The decoder 29 is simply an integrating type device which converts the digital sequence back into an amplitude varying waveform. The digital sequence on the receive channel is applied also to receive sequence detector 20. This sequence detector includes a shift register and associated logic for generating a signal on line 22 upon the detection of four ones in succession. Also, a signal will be impressed on line 24 upon four zeros being detected in succession.

The heart of the control of the system comprises a read-only memory 6 and up/down counters 8 and 34. In this context, each occurrence of a predetermined number of successive matched digits as, for example, either four ones or four zeros is used to correspondingly increment or decrement an up/down counter which serves also as the memory address register.

In channel I when sequence detector 74 senses four ones in succession, then counter 8 is incremented by a predetermined amount. Similarly, when detector 74 senses four zeros in succession, counter 8 is decremented by a predetermined amount. The counter states constitute a memory address register $A_0$, $A_1$, $A_2$, $A_3$. These are shown applied to read-only memory 6 and constitute path 35. In the same manner, sequence detector 20 increments or decrements counter 34 upon the detection of four ones or zeros in succession in receive channel II. The stages of counter 34 $A'_0$, $A'_1$, $A'_2$, $A'_3$, form another portion of the memory address register and are directly applied as such to read-only memory 6 over path 33. It should be observed that clocking means 2 conditions appropriate gating circuits 82 and 84 and 26 and 28 to enable the signal from the respective detectors 74 and 20 to be applied to the respective counters 8 and 34. As might be suspected, if the run of detected successive ones or zeros exceeds the count capacity, then an overflow or an underflow protection is needed in order to avoid a maximum gain from jumping to a minimum gain and from disturbing the echo suppressor behavior. Suppose up/down counter 8 consisted of four states. If four ones were stored therein, then the outputs of AND gates 60, 62, 64, and 66 would all be one, while the corresponding overflow and underflow outputs on paths 86 and 18 from NAND gates 10 and 12 would each be zero thereby deactivating gates 82 and 84.

As was previously mentioned, the rule of action of suppressors is that they work in favor of that channel having the highest detected level or gain at any point in time. As is readily apparent, the contents of the respective counters represent a digital measure of the rate of change of the corresponding analog signal. Consequently, a succession of ones represents an increasing magnitude or gain while a succession of zeros represents a decrease of magnitude or gain. In this embodiment, the contents of each counter then serves two purposes. First, as a designation of a memory address and second, as an indication of relative magnitude difference.

If the contents of counter 8 have a magnitude A greater than the magnitude A' of the contents of counter 34, then the amplitude or gain of the transmit channel I exceeds that of the receive channel. Accordingly, the inhibit gate 9 is not activated and the gain of the receive channel is reduced. In this case, this is instrumented by having the memory output shift the contents of counter 34 shifted in a direction so as to diminish magnitude A'. If the magnitude A' of counter 34 exceeds the magnitude A of counter 8, then the inhibit gate 9 is activated by a signal from the read-only memory 6 over path 39.

Figures 3, 3A:
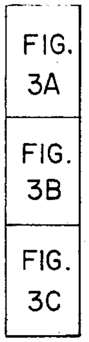
FIG. 3 sets forth the compositional arrangement of FIGS. 3A, B, and C.
FIGS. 3A, B, and C depict the contents of the memory in which the control signals are stored in selected memory locations whose addresses are defined by the respective transmit and receive channel counters.
Figure 3B:
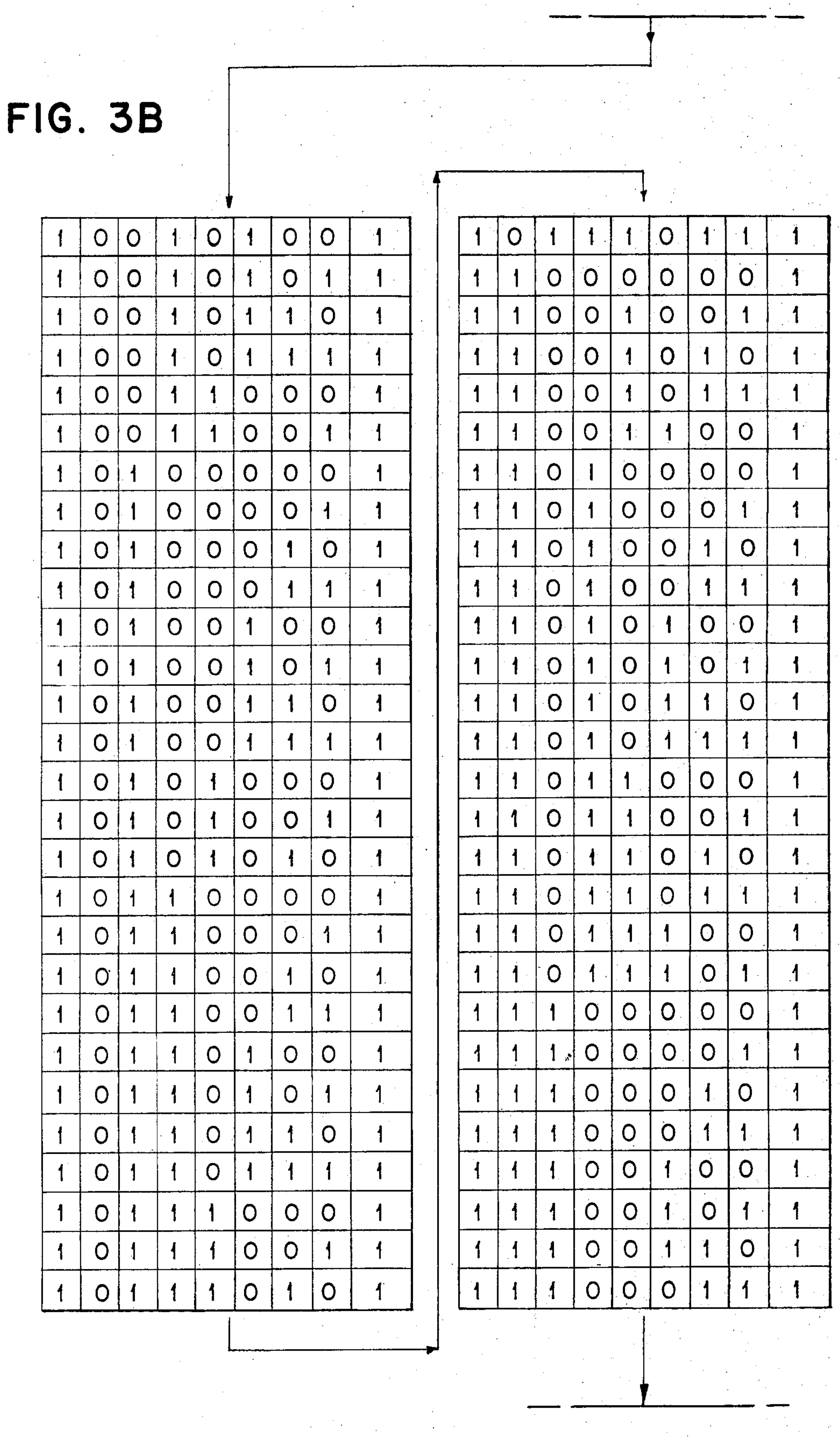

Referring now to FIG. 3, there is shown a sketch suggesting the arrangement for the FIGS. 3A, 3B, and 3C. What is depicted in these figures are the contents of the control signal at various addresses defined by the counter 8 and 34 contents. In order to shorten the exposition, only those addresses are listed in which the memory content is "one." More particularly, each address is defined by eight bits $A_0$–$A_3$, $A'_0$–$A'_3$. In all, there are two $2^8$ memory locations. The control signal "one" stored in the addresses for purposes of this discussion is defined as the signal that disables the inhibit gate and shifts counter 34 to the right. For purposes of consistency, if one compares the magnitude of the binary number $A_3$, $A_2$, $A_1$, $A_0$ with the magnitude of the binary number $A'_3$, $A'_2$, $A'_1$, $A'_0$ it will be apparent in each case that the first number is equal to or greater than the second number.

If a signal is received on channel II, then clearly A' is greater than A and inhibit gate 9 is opened. Then for all practical purposes, a signal applied to channel I will not seize control of the inhibit gate unless and until its rate of change magnitude exceeds the corresponding rate of change magnitude on the receive channel. It should be clear that both the transmit and receive sequence detectors are inserted to provide sufficient inertia into the system so as to avoid excessive suppressor action when either a brief noise or transient has been impressed on the system.

The read-only memory 6 can consist of, for example, a diode matrix, a magnetic core memory, or any other suitable alterable storage. If alterable storage means are used, then the threshold or suppressor action can be changed at will. Indeed, there may be regions where it may be desired to suppress in contradistinction to other regions of amplitude.

In principle, any analog to digital and digital to analog conversion technique can be used. In this embodiment, delta modulation was shown to illustrate the principle of the invention and avoid equipment complexity.

Analog signal functions are usually continuous and analytic, see for example the description of analytic functions by R. V. Churchill, in "Introduction to Complex Variables," McGraw Hill Book Co., New York, 1948, pages 18–36. Restated, such functions do not usually exhibit abrupt discontinuities which means that there is a high probability of following them within minimum error with the equivalent of a discrete counting device. It should thus be feasible to convert analog signals into successive PCM samples and measure rates of change. In such PCM systems, a difference exceeding a predetermined amount would be equivalent to a match of successive digits in the delta mod scheme and call for the incrementing or decrementing of a counter corresponding to the direction of change. From that point, the operation of the system should be substantially the same.

While the invention has been particularly shown and described with reference to preferred embodiments thereof, it will be understood by those skilled in the art that various changes in form and details may be made therein without departing from the spirit and scope of the invention.

What is claimed is:

1. In a communications system having a transmit channel and a receive channel, the combination comprising:

means for deriving digitally delta coded signal samples from the transmit and receive channels;

suppressor means in the transmit channel operatively responsive to successive control signals;

memory means having control signals stored at discrete locations therein; and means responsive to the derived digital delta coded signal samples for forming memory addresses from the number of successive matched delta digits derived from each channel, for extracting the control signals from the memory addresses, and for applying the successively extracted control signals to the suppressor means.

2. In a communications system having a transmit channel and a receive channel, the combination comprising:

suppressor means in the transmit channel operatively responsive to control signals;

memory means having control signals stored at discrete memory locations therein;

means for deriving digital delta modulation encoded signal samples from the transmit and receive channels;

reversible counting means;

means for successively extracting the control signals from the memory means at those locations whose addresses are determined by the contents of the reversible counting means, and for applying said extracted control signals to the suppressor means; and means for incrementing or decrementing the reversible counting means according as to whether a predetermined succession of matched digits of a first or second kind are derived from either the transmit or receive channels.

3. In a communications system according to claim 2, wherein:

a reversible counting means comprises a transmit channel counter and a receive channel counter;

the incrementing/decrementing means includes means respectively responsive to successive digital sequences from the transmit and receive channels for detecting a predetermined succession of matched digits of a first kind or of a second kind, and for incrementing the corresponding counter each time the predetermined succession of digits of the first kind is detected, and for decrementing the corresponding counter each time the predetermined succession of matched digits of the second kind is detected.

4. In a communications system having a transmit channel and a receive channel, the combination comprising:

suppressor means in the transmit channel operatively responsive to control signals of a first and a second kind;

memory means having control signals of a first or second kind stored at discrete memory locations having addressing coordinates AA', those locations having address coordinates $A \geq A'$ storing the control signal of the first kind, while those locations having address coordinates $A < A'$ storing control signals of the second kind;

means for deriving digital delta modulation encoded analog signal samples from the transmit and receive channels;

reversible counting means;

means for successively extracting control signals from the memory means at those locations whose addresses AA' are determined by the reversible counting means, and for applying the extracted control signals to the suppressor means; and means for incrementing or decrementing the A or A' portions of the reversible counting means according as to whether a predetermined succession of matched digits of a first or second kind were respectively derived from either the transmit or receive channels.

5. In a communications system according to claim 4, wherein:

the means for applying the extracted control signals include means for diminishing the count of the A′ portion of the reversible counting means in response to an extracted control signal of the first kind.

* * * * *